United States Patent
Yamazaki et al.

(10) Patent No.: US 9,674,842 B2
(45) Date of Patent: Jun. 6, 2017

(54) COMMUNICATION CONTROL METHOD, BASE STATION, AND USER TERMINAL

(71) Applicant: KYOCERA CORPORATION, Kyoto (JP)

(72) Inventors: Chiharu Yamazaki, Ota-ku (JP); Noriyoshi Fukuta, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 291 days.

(21) Appl. No.: 14/355,091

(22) PCT Filed: Nov. 2, 2012

(86) PCT No.: PCT/JP2012/078518
§ 371 (c)(1),
(2) Date: Apr. 29, 2014

(87) PCT Pub. No.: WO2013/065837
PCT Pub. Date: May 10, 2013

(65) Prior Publication Data
US 2014/0286286 A1 Sep. 25, 2014

Related U.S. Application Data

(60) Provisional application No. 61/555,290, filed on Nov. 3, 2011.

(51) Int. Cl.
*H04W 72/04* (2009.01)
*H04W 56/00* (2009.01)
(Continued)

(52) U.S. Cl.
CPC ....... *H04W 72/0473* (2013.01); *H04J 11/005* (2013.01); *H04J 11/0023* (2013.01);
(Continued)

(58) Field of Classification Search
CPC .. H04W 40/244; H04J 11/0079; H04J 11/005; H04J 11/0056; H04L 27/261; H04L 27/2611; H04L 27/2613
See application file for complete search history.

(56) References Cited

U.S. PATENT DOCUMENTS

2007/0202902 A1  8/2007  Jansen et al.
2009/0003477 A1*  1/2009  Nishio .................. H04L 5/0053
                                                       375/260
(Continued)

FOREIGN PATENT DOCUMENTS

JP  WO 2011039925 A1 *  4/2011  ............. H04B 7/022
WO    2007/036039 A1    4/2007
(Continued)

OTHER PUBLICATIONS

3rd Generation Partnership Project; "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)" 3GPP TS 36.300 V10.5.0 Sep. 2011.*
(Continued)

*Primary Examiner* — Robert M Morlan
(74) *Attorney, Agent, or Firm* — Studebaker & Brackett PC

(57) ABSTRACT

A communication control method in a mobile communication system, comprises: a step A of transmitting, from a first base station, a first synchronization signal at a first frequency band in the center of a particular carrier, the first synchronization signal being for use to establish synchronization; and a step B of transmitting, from the first base station, a second synchronization signal in a second frequency band
(Continued)

different from the first frequency band within the particular carrier, the second synchronization signal being for use to establish synchronization.

12 Claims, 11 Drawing Sheets

(51) Int. Cl.
*H04J 11/00* (2006.01)
*H04L 27/26* (2006.01)
*H04W 52/14* (2009.01)
*H04W 52/24* (2009.01)
*H04W 52/36* (2009.01)

(52) U.S. Cl.
CPC ...... *H04J 11/0073* (2013.01); *H04L 27/2655* (2013.01); *H04L 27/2688* (2013.01); *H04W 56/00* (2013.01); *H04W 52/143* (2013.01); *H04W 52/244* (2013.01); *H04W 52/367* (2013.01)

(56) References Cited

U.S. PATENT DOCUMENTS

| | | | | |
|---|---|---|---|---|
| 2009/0225824 | A1* | 9/2009 | Noh | H04L 27/2613 375/240 |
| 2009/0252075 | A1 | 10/2009 | Ji et al. | |
| 2009/0274112 | A1 | 11/2009 | Ma et al. | |
| 2010/0008317 | A1 | 1/2010 | Bhattad et al. | |
| 2010/0029278 | A1* | 2/2010 | Fang | H04W 36/0055 455/436 |
| 2010/0309797 | A1* | 12/2010 | Lindoff | H04B 17/318 370/252 |
| 2011/0310878 | A1* | 12/2011 | Lindoff | H04J 11/005 370/343 |
| 2012/0190359 | A1* | 7/2012 | Aminaka | H04B 7/022 455/422.1 |
| 2012/0320833 | A1 | 12/2012 | Yamamoto et al. | |
| 2013/0077576 | A1 | 3/2013 | Abe et al. | |
| 2013/0217407 | A1* | 8/2013 | Gerlach | H04W 28/08 455/453 |

FOREIGN PATENT DOCUMENTS

| | | |
|---|---|---|
| WO | 2007/077530 A2 | 7/2007 |
| WO | 2011/108028 A1 | 9/2011 |
| WO | 2011/126008 A1 | 10/2011 |

OTHER PUBLICATIONS

The extended European search report issued by the European Patent Office on May 20, 2015, which corresponds to European Patent Application No. 12846638.0-1852 and is related to U.S. Appl. No. 14/355,091.

Communication pursuant to Rules 70(2) and 70a(2) EPC issued by the European Patent Office on Jun. 8, 2015, which corresponds to European Patent Application No. 12846638.0-1852 and is related to U.S. Appl. No. 14/355,091.

International Search Report; PCT/JP2012/078518; Dec. 11, 2012.

Research in Motion UK Limited, "PSS/SSS Detection in Heterogeneous Networks", 3GPP TSG-RAN WG1 Meeting #66 R1-112369, Aug. 26, 2011.

3GPP TS 36.300 V10.4.0 (Jun. 2011); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).

* cited by examiner

FIG. 4
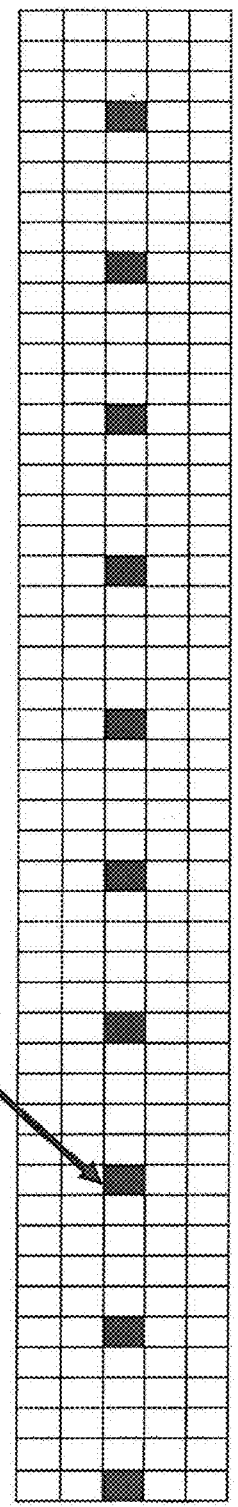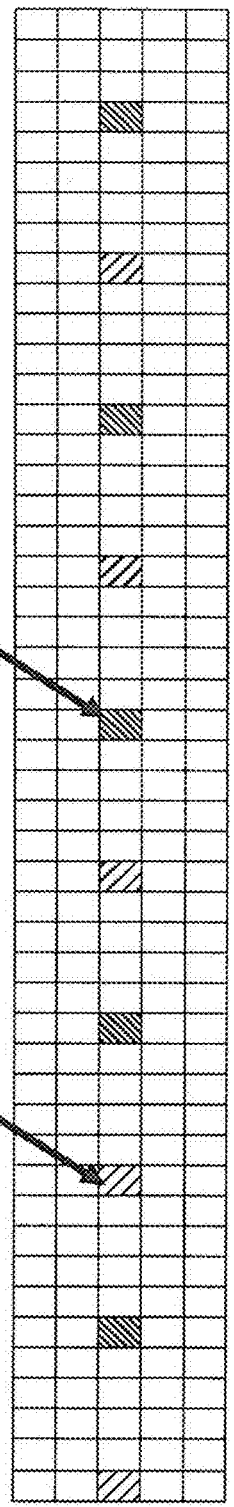

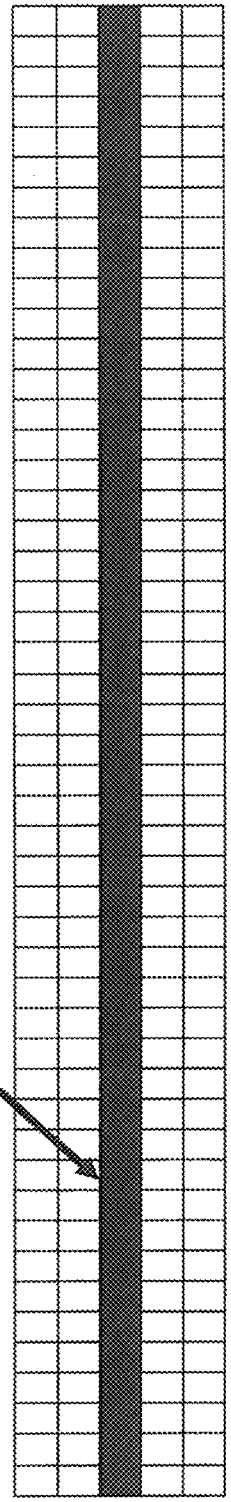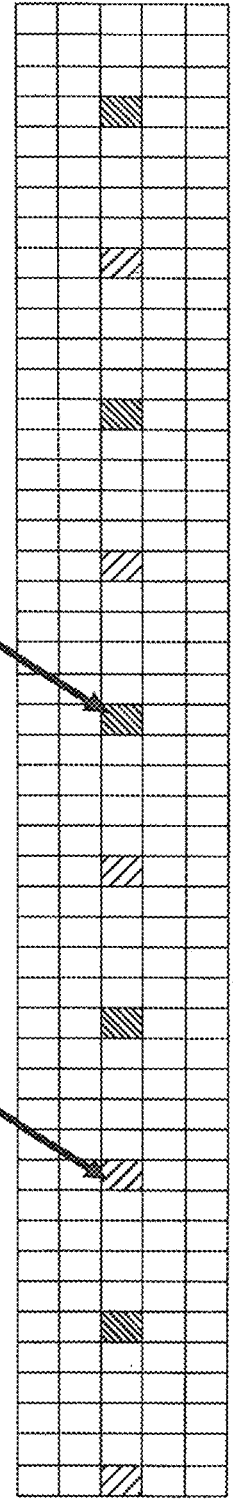
FIG. 5
SUBFRAME SYNC.+NON SUBFRAME OFFSET(2)
OR
NON SUBFRAME SYNC.

FIG. 10
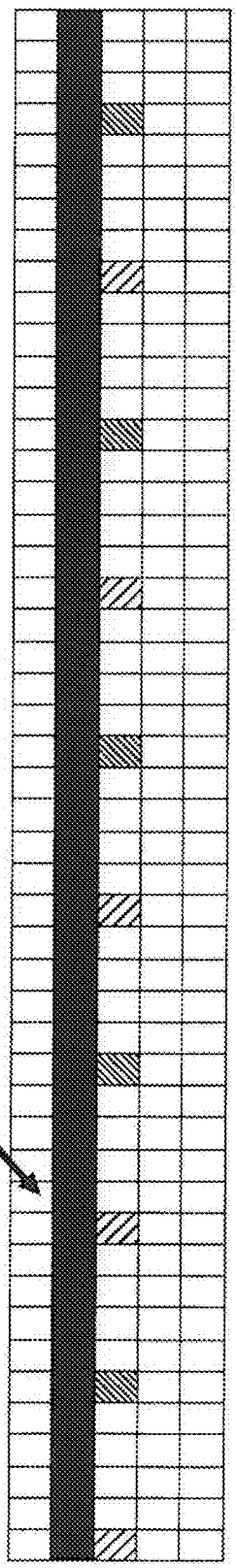
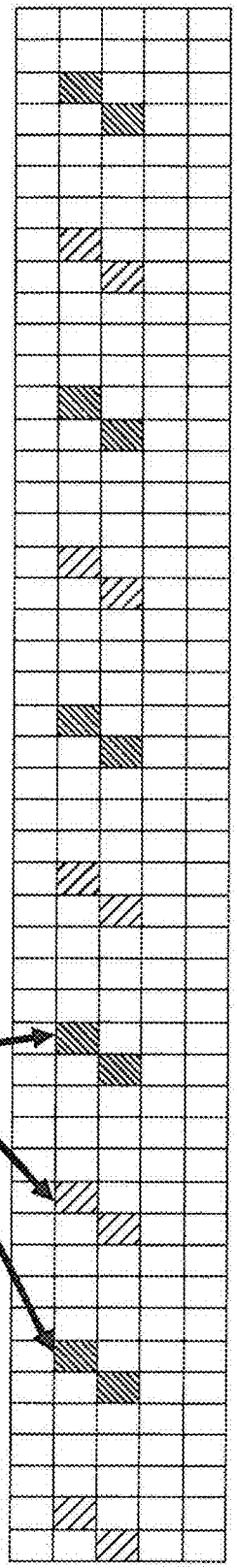

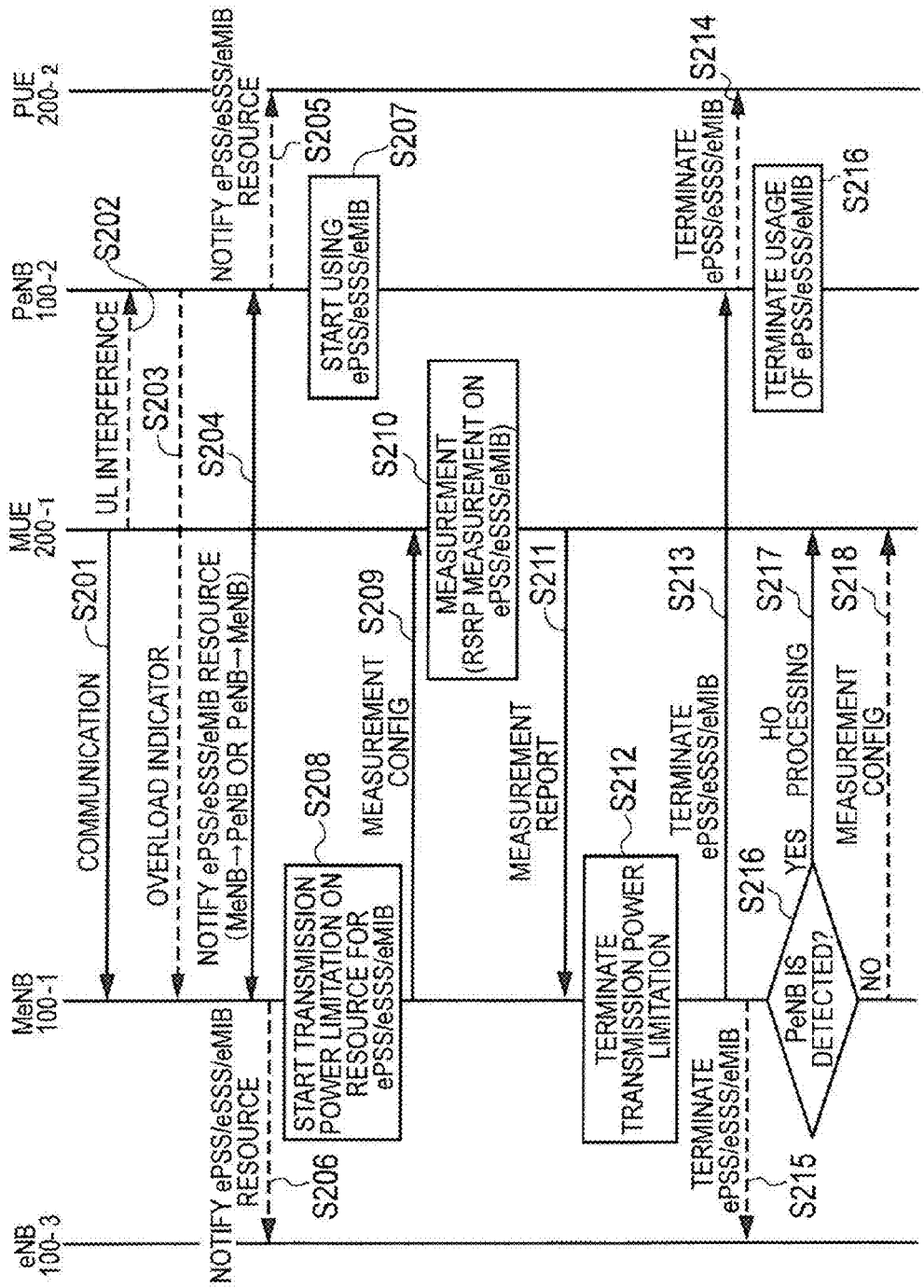

COMMUNICATION CONTROL METHOD, BASE STATION, AND USER TERMINAL

TECHNICAL FIELD

The present disclosure relates to a communication control method, a base station, and a user terminal in a mobile communication system.

BACKGROUND ART

The 3GPP (3rd Generation Partnership Project), which is a standardization project for mobile communication system, has been developing the standardization of LTE Advanced, which is an advanced version of LTE (Long Term Evolution) after the 3GPP Release 10 (see, for example, 3GPP TS 36.300 v10.4.0).

In LTE-Advanced, discussion has been made on provision of a heterogeneous network in which a low-power base station (so-called, a pico cell base station or a home base station) is installed in a coverage area of a high-power base station (so-called, a macro base station). The heterogeneous network can distribute a load of the high-power base station to the low-power base station.

In addition, with a view to both providing backward compatibility with LTE and achieving a wider bandwidth, a carrier aggregation technique is introduced to LTE Advanced, in which a carrier in LTE is used as a component carrier (CC) and multiple carriers are used in combination for radio communications. Note that a "carrier" is sometimes treated as a "cell".

CITATION LIST

Non-Patent Documents

Non-Patent Documents 1: 3GPP TS36.300 v10.4.0

SUMMARY OF INVENTION

In a heterogeneous network where a high-power base station and a low-power base station use one and the same carrier, if a user terminal connected with the high-power base station is located around the boundary of a coverage area of the low-power base station, the low-power base station may receive uplink interference from the user terminal.

In this connection, the following procedure, for example, is under consideration as a solution to the uplink interference. Specifically, based on a measurement report from a user terminal connected with a high-power base station, the high-power base station infers that an interference source is the user terminal succeeding in measurement for a low-power base station (that is, the user terminal that can normally receive a synchronization signal from the low-power base station), and causes the user terminal of the interference source to perform handover to another carrier.

However, even when being located around the boundary of the coverage area of the low-power base station, the user terminal connected with the high-power base station cannot receive a synchronization signal from the low-power base station because the synchronization signal is cancelled out by a downlink signal from the high-power base station due to a transmission power difference between the base stations. In this case the user terminal cannot synchronize with the low-power base station nor perform the measurement for the low-power base station.

A possible solution to this is that the high-power base station limits transmission power (specifically, cuts power or decreases power) at timing and frequency in which the low-power base station transmits the synchronization signal, so that a user terminal can perform the measurement for the low-power base station.

It is specified that the frequency band for transmitting a synchronization signal is 6 resource blocks in the center in a carrier. When a high-power base station and a low-power base station synchronize with each other with setting of such offset (subframe offset) as to transmit synchronization signals at different timings, the high-power base station does not need to limit the transmission power of the synchronization signal. On the other hand, when a high-power base station and a low-power base station do not synchronize with each other, or synchronize with each other without setting of the offset, the high-power base station needs to limit transmission power.

However, if a high-power base station limits transmission power, communication disruption or communication failure may occur in a user terminal that is located under control of a neighboring base station and is to perform handover to the cell (carrier) of the high-power base station or a user terminal under control of the high-power base station.

Accordingly, an objective of the present invention is to solve the above-described problems.

A communication control method according to the present invention is a communication control method in a mobile communication system. The method comprises: a step A of transmitting, from a first base station (e.g. PeNB 100-2), a first synchronization signal at a first frequency band in the center of a particular carrier, the first synchronization signal being for use to establish synchronization; and a step B of transmitting, from the first base station, a second synchronization signal in a second frequency band different from the first frequency band within the particular carrier, the second synchronization signal being for use to establish synchronization.

The communication control method according to the present invention, wherein the first synchronization signal includes a first primary synchronization signal and a first secondary synchronization signal, the second synchronization signal includes a second primary synchronization signal and a second secondary synchronization signal, and at the step B, the second primary synchronization signal and the second secondary synchronization signal are transmitted using a same resource block.

The communication control method according to the present invention, wherein at the step B, the second primary synchronization signal and the second secondary synchronization signal are transmitted using a same resource block and a same subframe.

The communication control method according to the present invention, wherein at the step A, the first base station further transmits a first master information block containing system information in the first frequency band, and at the step B, the first base station further transmits a second master information block containing system information in the second frequency band.

The communication control method according to the present invention, wherein the first synchronization signal includes a first primary synchronization signal and a first secondary synchronization signal, the second synchronization signal includes a second primary synchronization signal and a second secondary synchronization signal, and at the step B, the second primary synchronization signal, the second secondary synchronization signal, and the second master information block are transmitted using a same resource block.

The communication control method according to the present invention, wherein at the step B, the second primary synchronization signal, the second secondary synchronization signal, and the second master information block are transmitted using a same resource block and a same subframe.

The communication control method according to the present invention, further comprises a step C of notifying in which the first base station notifies a second base station (e.g. MeNB 100-1, eNB 100-Y) in the neighborhood of the first base station of a radio resource to be used for the transmission at the step B.

The communication control method according to the present invention, further comprises: a step C of receiving a notification by the first base station from a second base station (e.g. MeNB 100-1) neighboring the first base station, the notification indicating a radio resource to be used for the transmission at the step B, wherein at the step B, the first base station performs transmission with the radio resource notified at the step C.

The communication control method according to the present invention, further comprises a step D of notifying, by the second base station, a third base station (e.g. eNB 100-X) in the neighborhood of the second base station, of the radio resource to be used for the transmission at the step B.

The communication control method according to the present invention, further comprises a step E of notifying, by the first base station, a first user terminal (e.g. PUE 200-2) under control of the first base station, of the radio resource to be used for the transmission at the step B.

The communication control method according to the present invention, further comprises a step F of notifying, by the second base station, a second user terminal (e.g. MUE 200-1) under control of the second base station, of the radio resource to be used for the transmission at the step B.

The communication control method according to the present invention, further comprises a step G of performing measurement by the second user terminal using the radio resource notified by the second base station at the step F.

The communication control method according to the present invention, further comprises a step H of limiting, by the second base station, transmission power in the radio resource to be used for the transmission at the step B.

A base station according to the present invention is a base station (e.g. PeNB 100-2) in a mobile communication system. The base station comprises: a first transmission unit configured to transmit a first synchronization signal in a first frequency band in the center within a particular carrier, the first synchronization signal being for use to establish synchronization; and a second transmission unit configured to transmit a second synchronization signal in a second frequency band different from the first frequency band within the particular carrier, the second synchronization signal being for use to establish synchronization.

A user terminal according to the present invention is a user terminal (e.g. MUE 200-1) in a mobile communication system. The user terminal comprises: a reception unit configured to receive a second synchronization signal from a base station (e.g. PeNB 100-2) which transmits a first synchronization signal in a first frequency band in the center within a particular carrier and transmits the second synchronization signal in a second frequency band different from the first frequency band within the particular carrier; and a measurement unit configured to perform measurement based on the second synchronization signal received by the reception unit.

BRIEF DESCRIPTION OF THE DRAWINGS

FIG. 4 shows one example of muting/power reduction in a case where the MeNB and PeNB according to the first embodiment operate in subframe synchronization without setting of subframe offset.

FIG. 5 shows one example of muting/power reduction in a case where the MeNB and PeNB according to the first embodiment operate out of subframe synchronization.

FIG. 10 shows one example of ePSS/eSSS/eMIB and muting/power reduction in a case where the MeNB and PeNB according to the second embodiment operate out of subframe synchronization.

FIG. 11 shows one example of an entire operation of the mobile communication system according to the second embodiment.

DESCRIPTION OF EMBODIMENTS

Figure 1:
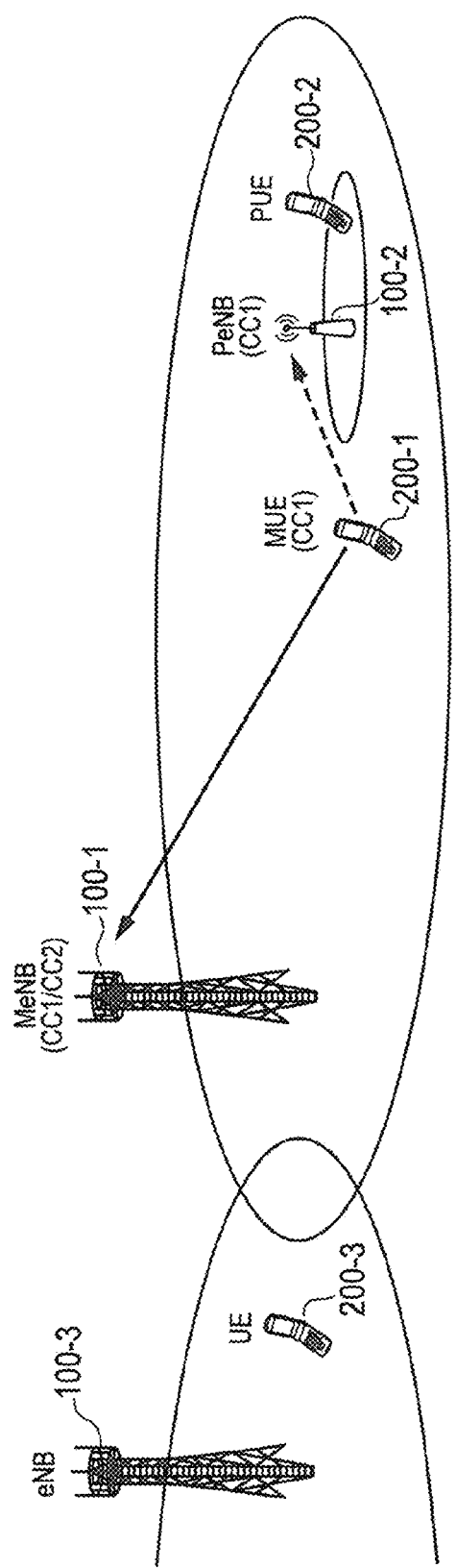
FIG. 1 shows a mobile communication system according to first and second embodiments.

Embodiments of the present invention are described below by referring to the drawings. In the drawings of the embodiments, same or similar reference numerals are given to same or similar portions.

First Embodiment

FIG. 1 shows a mobile communication system according to the present embodiment. A mobile communication system according to the present embodiment is configured based on LTE Advanced (after the 3GPP Release 10).

As shown in FIG. 1, the mobile communication system has a macro base station (Macro evolved Node-B: MeNB) 100-1 forming a large-scale coverage area, a pico cell base station (Pico evolved Node-B: PeNB) 100-2 forming a small-sized coverage area, and an eNB 100-3 in the neighborhood of the MeNB 100-1. As an eNB 100-3, an MeNB is illustrated but it may be a PeNB. Also, FIG. 1 shows only one PeNB 100-2 installed within the coverage area of the MeNB 100-1, but multiple PeNBs 100-2 may be installed within the coverage area of the MeNB 100-1. Each of the MeNB 100-1, PeNB 100-2, and eNB 100-3 is connected with one or multiple user terminals (User Equipment: UE).

Hereinafter, a UE connected with the MeNB 100-1 is referred to as an MUE 200-1, a UE connected with the PeNB 100-2 is referred to as a PUE 200-2, and a UE connected with the eNB 100-3 is referred to as a UE 200-3. In addition, when the MeNB 100-1, PeNB 100-2, and eNB 100-3 are not particularly distinguished from one another, they are simply called as an eNB 100, and when the MUE 200-1, PUE 200-2, and UE 200-3 are not particularly distinguished from one another, they are simply referred to as a UE 200.

Note that connection means a state where the UE 200 synchronizes with the eNB 100, that is, a state where a radio resource can be allocated from the eNB 100 to the UE 200. Also, uplink means a communication direction from the UE 200 to the eNB 100, and downlink means a communication direction from the eNB 100 to the UE 200.

The MeNB 100-1, PeNB 100-2, and eNB 100-3 are included in E-UTRAN (Evolved-UMTS Terrestrial Radio Access Network), which is a LTE radio access network. In the present embodiment, E-UTRAN is configured as a heterogeneous network, and the PeNB 100-2 is installed in the coverage area of the MeNB 100-1 and also in a high-traffic zone (so-called, a hot zone), for example.

In the present embodiment, the MeNB 100-1 supports two different carriers (CC1, CC2) and can use a carrier selected from the two carriers for radio communications. Each carrier includes multiple resource blocks (RB) in a frequency direction. In addition, in the embodiment, the PeNB 100-2 supports one carrier (CC1) and uses the one carrier for radio communications.

The coverage area includes one or more cells. The cell is identified by a cell ID and is associated with a carrier. Note that a carrier, an eNB 100 using the carrier, and a coverage area of the eNB 100 are collectively referred to as a cell. For this reason, the MeNB 100-1 is sometimes referred to as a macro cell and the PeNB 100-2 is referred to as a pico cell. Each cell (each CC) broadcasts a synchronization signal to be used for synchronization, a master information block (MIB) containing system information and a system information block (SIB). The synchronization signal contains a primary synchronization signal (PSS) and a secondary synchronization signal (SSS).

The UE 200 can switch a cell of a connection destination (referred to as a serving cell) while being in a connected (RRC Connected) state that is equivalent to a state being connected. Such serving cell switching is implemented by, for example, a handover. The handover of the UE 200 is controlled by the serving cell of the UE 200.

An X2 interface, which is a logical communication channel for connecting neighboring base stations with each other, is set up between the MeNB 100-1 and the PeNB 100-2. Also, an S1 interface, which is a logical communication channel with an EPC (Evolved Packet Core) which is an LTE core network, is set up between the EPC and the MeNB 100-1 and between the EPC and the PeNB 100-2.

As described above, when the MeNB 100-1 and the PeNB 100-2 use the same carrier (CC1) and the MUE 200-1 using CC1 is located around the boundary of the coverage area of the PeNB 100-2, the PeNB 100-2 may receive uplink interference from the MUE 200-1. In this case, based on a measurement report from the MUE 200-1, the MeNB 100-1 infers that an interference source is the MUE 200-1 succeeding in measurement for reference signal received power (RSRP) for the PeNB 100-2, that is, the MUE 200-1 that can normally receive PSS/SSS from the PeNB 100-2, and causes the MUE 200-1 of the interference source to perform handover to another other carrier (CC2). In this way, the MeNB 100-1 can solve the uplink interference.

However, even though the MUE 200-1 is located around the boundary of the coverage area of the PeNB 100-2, the MUE 200-1 cannot synchronize with the PeNB 100-2 nor perform RSRP measurement for the PeNB 100-2 if the PSS/SSS from the PeNB 100-2 is cancelled out by the downlink signal from the MeNB 100-1 due to a transmission power difference between the MeNB 100-1 and the PeNB 100-2. In order that the MUE 200-1 can normally perform the RSRP measurement for the PeNB 100-2, the MUE 200-1 requires not only the PSS/SSS from the PeNB 100-2 but also the MIB from the PeNB 100-2. This is because the RSRP measurement requires downlink bandwidth information and the MIB includes the downlink bandwidth information.

For this reason, the MeNB 100-1 limits the transmission power (specifically, cuts power or decreases power) at timing and a frequency band in which the PeNB 100-2 of CC1 transmits PSS/SSS/MIB, so that the MUE 200-1 can perform the RSRP measurement for the PeNB 100-2. In the following, the power cut is referred to as "muting" and the power decrease is referred to as "power reduction".

Figure 2:
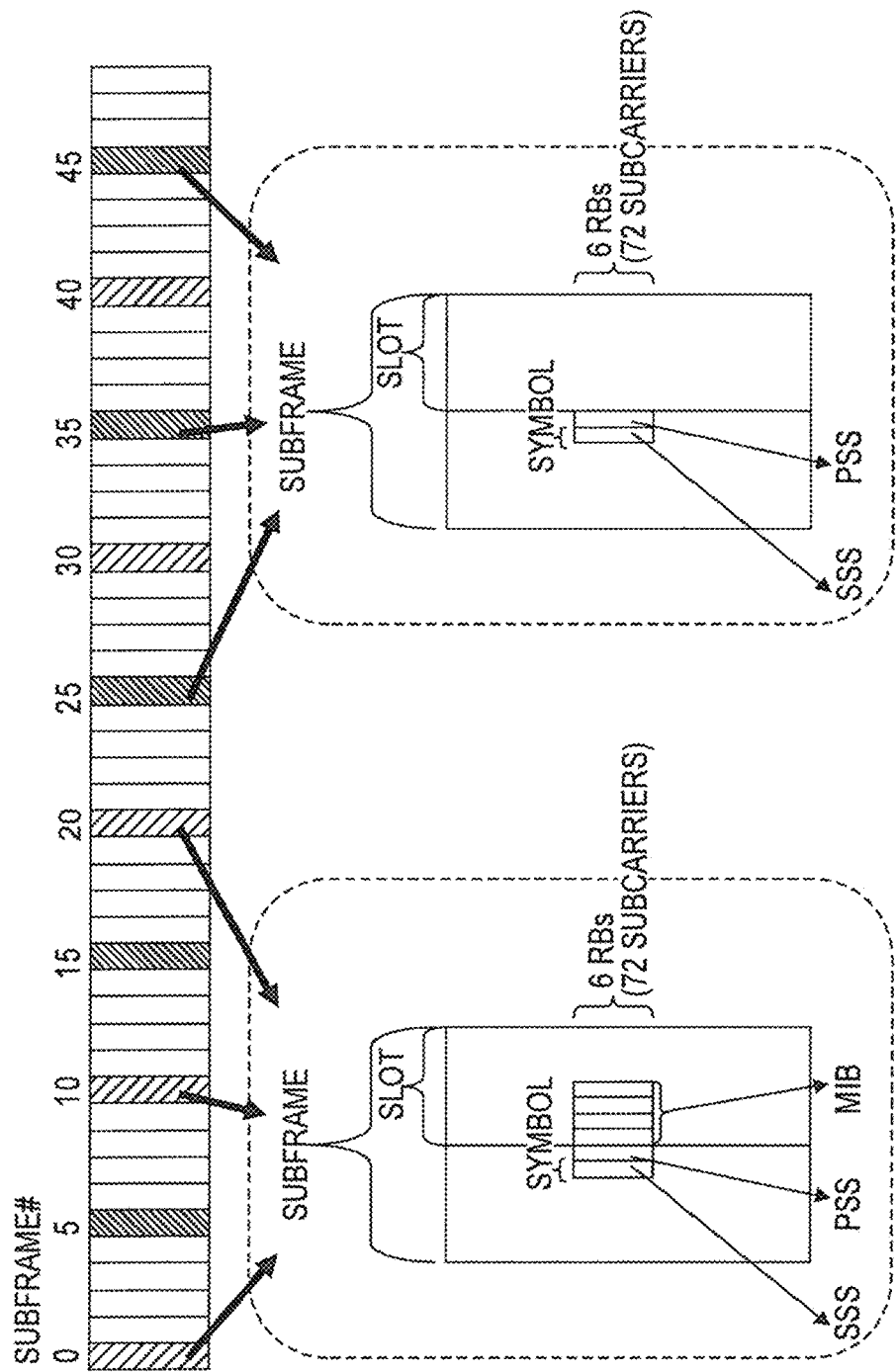
FIG. 2 shows a radio resource configuration which is used in the mobile communication system according to the first and second embodiments.

Here, the timing and frequency band of PSS/SSS/MIB are described. FIG. 2 shows a radio frame configuration which is used in the mobile communication system according to the present embodiment. As shown in FIG. 2, the radio frame includes 10 subframes arranged in a time direction and each subframe includes two slots. Each subframe has a length of 1 ms and each slot has a length of 0.5 ms. Also, each slot includes 7 OFDM symbols in the time direction and multiple RBs in a frequency direction. It is specified that the frequency band for transmitting PSS/SSS/MIB is 6 RBs in the center. The PSS is mapped to the last OFDM symbol of the first-half slot for every 5-th subframe and the SSS is mapped to the second OFDM symbol from the last in the same slot (that is, just before the PSS). The MIB is mapped to the fourth OFMD symbol from the head of the second-half slot for every 10-th subframe (every radio frame). Note that in the downlink, a region of several symbols from the head of each subframe is used as a physical downlink control channel (PDCCH) region and the following region is used as a downlink shared channel (PDSCH) region.

Figure 3:
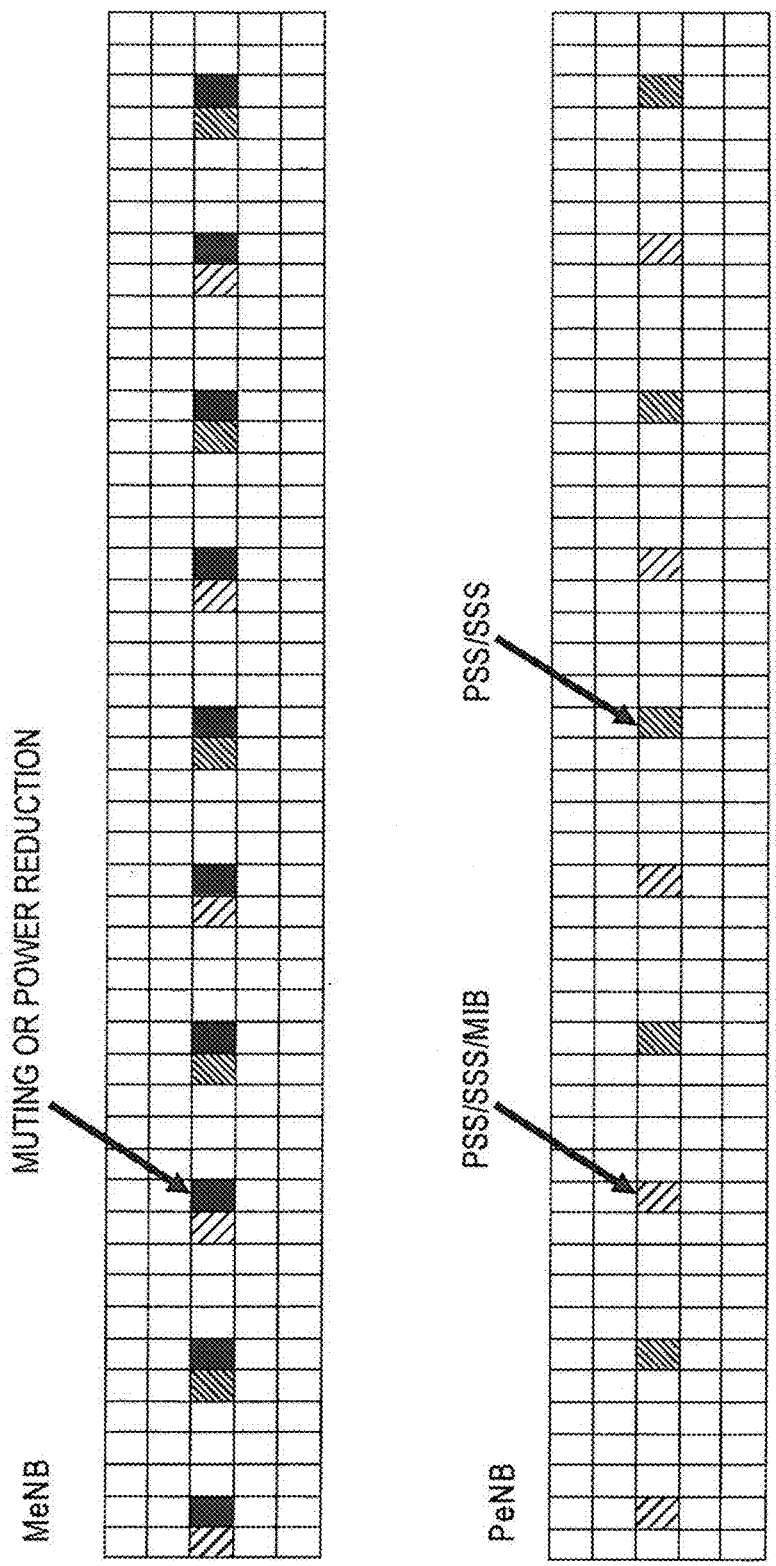
FIG. 3 shows one example of muting/power reduction in a case where an MeNB and a PeNB according to the first embodiment operate in subframe synchronization with setting of subframe offset.

FIG. 3 shows one example of muting/power reduction in a case where the MeNB 100-1 and the PeNB 100-2 operate in subframe synchronization with the setting of subframe offset. As shown in FIG. 3, in cases where the MeNB 100-1 and the PeNB 100-2 operate in subframe synchronization with the setting of such subframe offset as to transmit PSS/SSS/MIB at different timings, the MeNB 100-1 only needs to perform the muting/power reduction on a radio resource (the 6 RBs in the center in specific subframes) for the PSS/SSS/MIB, and does not need to perform the muting/power reduction on the PSS/SSS/MIB of the MeNB 100-1.

FIG. 4 shows one example of muting/power reduction in a case where the MeNB 100-1 and PeNB 100-2 operate in subframe synchronization without the setting of the subframe offset. As shown in FIG. 4, in the case where the MeNB 100-1 and the PeNB 100-2 operate in subframe synchronization without the setting of the subframe offset, the PSS/SSS/MIB of the MeNB 100-1 and the PSS/SSS/MIB of the PeNB 100-2 coincide with each other. Thus, the MeNB 100-1 has to perform the muting/power reduction on the PSS/SSS/MIB.

FIG. 5 shows one example of muting/power reduction in a case where the MeNB 100-1 and the PeNB 100-2 operate out of subframe synchronization. As shown in FIG. 5, in the case where the MeNB 100-1 and the PeNB 100-2 operate out of subframe synchronization, the MeNB 100-1 cannot identify at which timing (subframe) the PeNB 100-2 transmits PSS/SSS/MIB. Thus, the MeNB 100-1 has to perform the muting/power reduction on the 6 RBs in the center in all subframes in which the PeNB 100-2 possibly transmits PSS/SSS/MIB.

Such muting/power reduction can be performed for not only the PSS/SSS/MIB, but also a common reference signal (CRS), a PDCCH region, and an SIB. As shown in FIG. 4 and FIG. 5, when the MeNB 100-1 performs the muting/power reduction in CC1, communication disruption or communication failure may occur in the MUE 200-1 under control of the MeNB 100-1 or the UE that is to perform handover to the cell of the MeNB 100-1 (the UE 200-3 under control of the eNB 100-3 in the neighborhood of the MeNB 100-1 in FIG. 1).

Specifically, the UE 200-3 under control of the eNB 100-3 cannot find a cell of CC1 any longer by searching, and thus re-connection due to handover failure or the like may occur. Also, when the muting/power reduction is performed on CRS in addition to the PSS/SSS/MIB, the MUE 200-1 determines that the state of a propagation path between the MUE 200-1 and the MeNB 100-1 is deteriorated, and therefore transmits a CSI (Channel State Information) report showing the deteriorated state of the propagation path to the MeNB 100-1. As a result, the MeNB 100-1 cannot perform proper MCS (Modulation and Coding Scheme) control or multi-antenna control on the MUE 200-1. Thus, a throughput of the MUE 200-1 may be decreased.

For this reason, in the present embodiment, the following processing for the muting/power reduction is performed in order to properly perform a cell search for mobility control of the UE 200-3 under control of the eNB 100-3. Here, the mobility control means handover control or cell reselection control. Note that the UE 200-3 may be in an idle (RRC Idle) state or a connection (RRC Connected) state.

Specifically, the MeNB 100-1 transmits information to the eNB 100-3 on the X2 interface, the information notifying that a cell (the cell of CC1) under the muting/power reduction is to be prevented from being selected as a measurement (cell search) target for the mobility control of the UE 200-3. The information contains, for example, information designating the cell of CC1 as a cell search non-target cell. When receiving the information from the MeNB 100-1 on the X2 interface, the eNB 100-3 performs control based on the received information such that the UE 200-3 will avoid selecting the cell (the cell of CC1) under the muting/power reduction a measurement target. For example, in the case of using CC1/CC2, the eNB 100-3 perform such control that a measurement gap using CC2 is configured for the UE using CC1 and a measurement gap using CC1 is not configured for the UE using CC2. Accordingly, the cell search for the mobility control of the UE 200-3 under control of the eNB 100-3 can be properly performed.

Instead, the MeNB 100-1 transmits information to the eNB 100-3 on the X2 interface, the information instructing the eNB 100-3 to select the cell (the cell of CC2) not under the muting/power reduction as a measurement (cell search) target for the mobility control of the UE 200-3. The information contains, for example, information designating the cell of CC2 as a cell search target cell. When receiving the information from the MeNB 100-1 on the X2 interface, the eNB 100-3 performs control based on the received information such that the UE 200-3 will select the cell (the cell of CC2) not under the muting/power reduction as a measurement target. For example, the eNB 100-3 performs such control that a measurement gap using CC2 is configured for an UE not using CC2 among UEs under control of the eNB 100-3. Accordingly, the cell search for the mobility control of the UE 200-3 under control of the eNB 100-3 can be properly performed.

Furthermore, on the X2 interface, the MeNB 100-1 may give the eNB 100-3 at least one of notifications that the muting/power reduction in the cell of CC1 will be performed, that the muting/power reduction is being performed, and that the muting/power reduction is terminated.

In the present embodiment, when the muting/power reduction is performed, the following processing is performed in order for the MUE 200-1 to properly perform the CSI report. Note that, the CSI report contains a CQI (Channel Quality Information) report, PMI (Precoding Matrix Indicator), and RI (Rank Indicator).

Specifically, the MeNB 100-1 notifies the MUE 200-1 of a radio resource (subframe and RB) targeted for the muting/power reduction when performing the muting/power reduction on the CRS. After receiving the notification of the radio resource targeted for the muting/power reduction, the MUE 200-1 excludes the measurement result for the radio resource from the other measurement results to be reported to the MeNB 100-1. For example, in the case of the wide band CQI that is the average of the quality measurement results of all the RBs in the downlink bandwidth calculated and reported as CQI, the MUE 200-1 calculates and reports as CQI the average of the measurement results of only the RBs other than an RB targeted for the muting/power reduction. In addition, in the case of the muting/power reduction performed only on the specific subframe, if the measurement timing coincides with the muting/power reduction timing, the MUE 200-1 may delay the measurement until a subframe not under the muting/power reduction. With this, the MUE 200-1 can properly perform the CSI report.

As described above, the MUE 200-1 performs the RSRP measurement for the PeNB 100-2 within a period during which the MeNB 100-1 performs the muting/power reduction. In general, the RSRP measurement is performed on CRS in the RBs of the entire downlink bandwidth. However, the muting/power reduction is performed only on one part of the radio resource, and the CRS from the PeNB 100-2 is still affected by the interference from the MeNB 100-1. Thus, the MUE 200-1 may fail to properly perform the RSRP measurement for the PeNB 100-2. For this reason, it is preferable, but not essential, that the RSRP measurement be performed only on a specific RB.

Accordingly, in the present embodiment, the MeNB 100-1 transmits information for instructing the MUE 200-1 to measure RSRP of the PeNB 100-2 based only on CRS within a specific RB (RB under the muting/power reduction). The information contains information to designate RBs targeted for the RSRP measurement. When receiving the information from the MeNB 100-1, the MUE 200-1 measures the RSRP for the PeNB 100-2 based on the CRS only within the specific RB according to the information. With this, the MUE 200-1 can properly perform the RSRP measurement for the PeNB 100-2.

As described above, the MUE 200-1 performs the RSRP measurement for the PeNB 100-2 within a period during which the MeNB 100-1 performs the muting/power reduction. In general, the RSRP measurement for the PeNB 100-2 is performed based on the downlink bandwidth information contained in the MIB transmitted by the PeNB 100-2. However, the MUE 200-1 may fail to normally acquire the downlink bandwidth information contained in the MIB transmitted by the PeNB 100-2.

For this reason, in the present embodiment, the MeNB 100-1 notifies the MUE 200-1 of the downlink bandwidth information of the PeNB 100-2 (CC1). The information is, for example, the number of resource blocks. In the MIB, as described in TS 36.331, an index expressing the number of resource blocks in the form of {n6, n15, n25, n50, n75, n100} is notified, and the notification may be made in a similar manner. When receiving the information from the MeNB 100-1, the MUE 200-1 does not acquire the downlink bandwidth information in the MIB by receiving the MIB from the PeNB 100-2, but performs the RSRP measurement for the PeNB 100-2 based on the received information. With this, the MUE 200-1 can properly perform the RSRP measurement for the PeNB 100-2.

Figure 6:
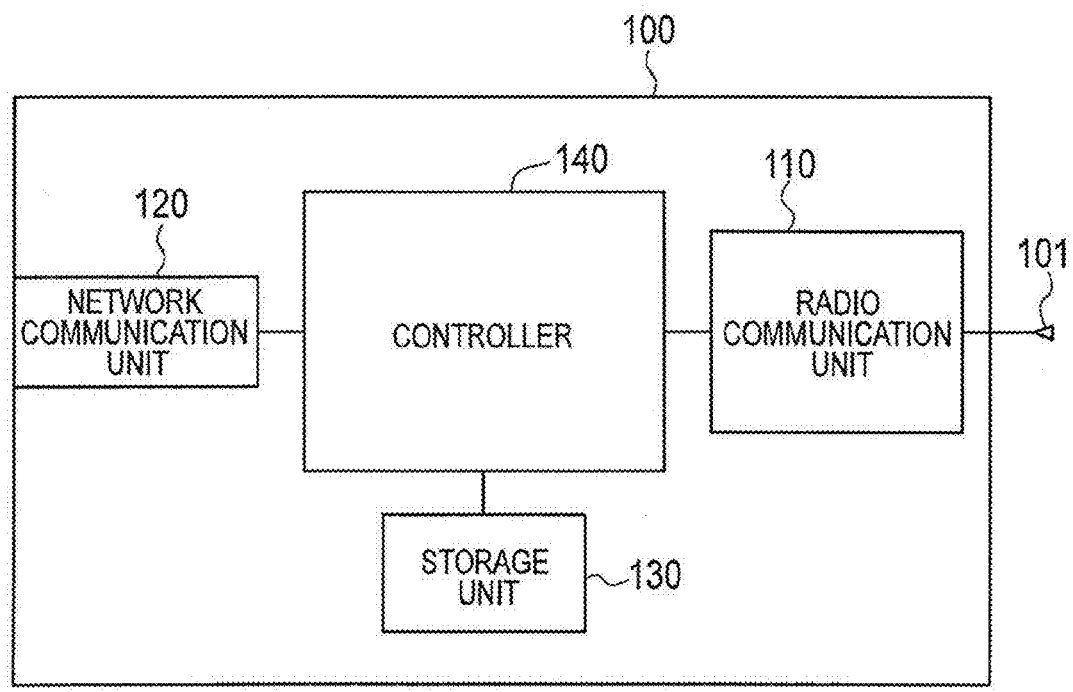
FIG. 6 is a block diagram of an eNB according to the first and second embodiments.

Hereinafter, the configuration of the eNB 100 is described. FIG. 6 is a block diagram of the eNB 100. As shown in FIG. 6, the eNB 100 has an antenna 101, a radio communication unit 110, a network communication unit 120, a storage unit 130, and a controller 140. The antenna 101 is used for transmitting and receiving radio signals, including, for example, multiple antenna elements. The radio communication unit 110 is configured using, for example, a radio frequency (RF) circuit and a base band (BB) circuit and transmits/receives a radio signal via the antenna 101. The network communication unit 120 performs communications between base stations with a neighboring eNB 100 on the X2 interface. Also, the network communication unit 120 performs communications with the EPC on an S1 interface. The storage unit 130 stores various pieces of information to be used for controlling the eNB 100 or the like. The controller 140 controls various kinds of functions included in the eNB 100.

Figure 7:
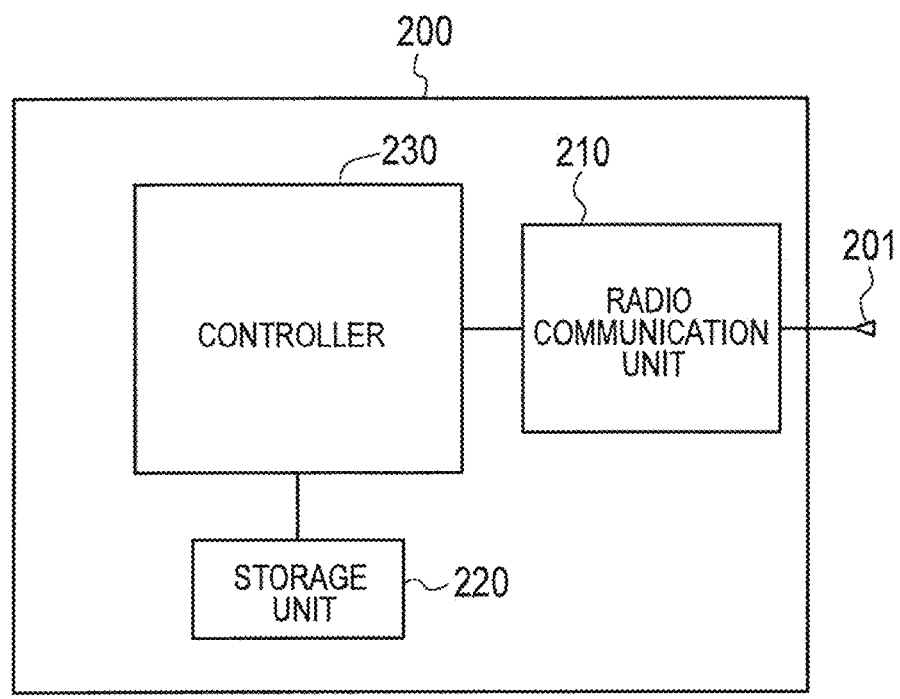
FIG. 7 is a block diagram of a UE according to the first and second embodiments.

Hereinafter, the configuration of a UE 200 is described. FIG. 7 is a block diagram of the UE 200. As shown in FIG. 7, the UE 200 has an antenna 201, a radio communication unit 210, a storage unit 220, and a controller 230. The antenna 201 is used for transmission and reception of a radio signal. The radio communication unit 210 is configured using, for example, a RF circuit and a BB circuit and transmits/receives a radio signal via the antenna 201. The storage unit 220 stores various pieces of information to be used for controlling the UE 200 or the like. The controller 230 controls various kinds of functions included in the UE 200.

Figure 8:
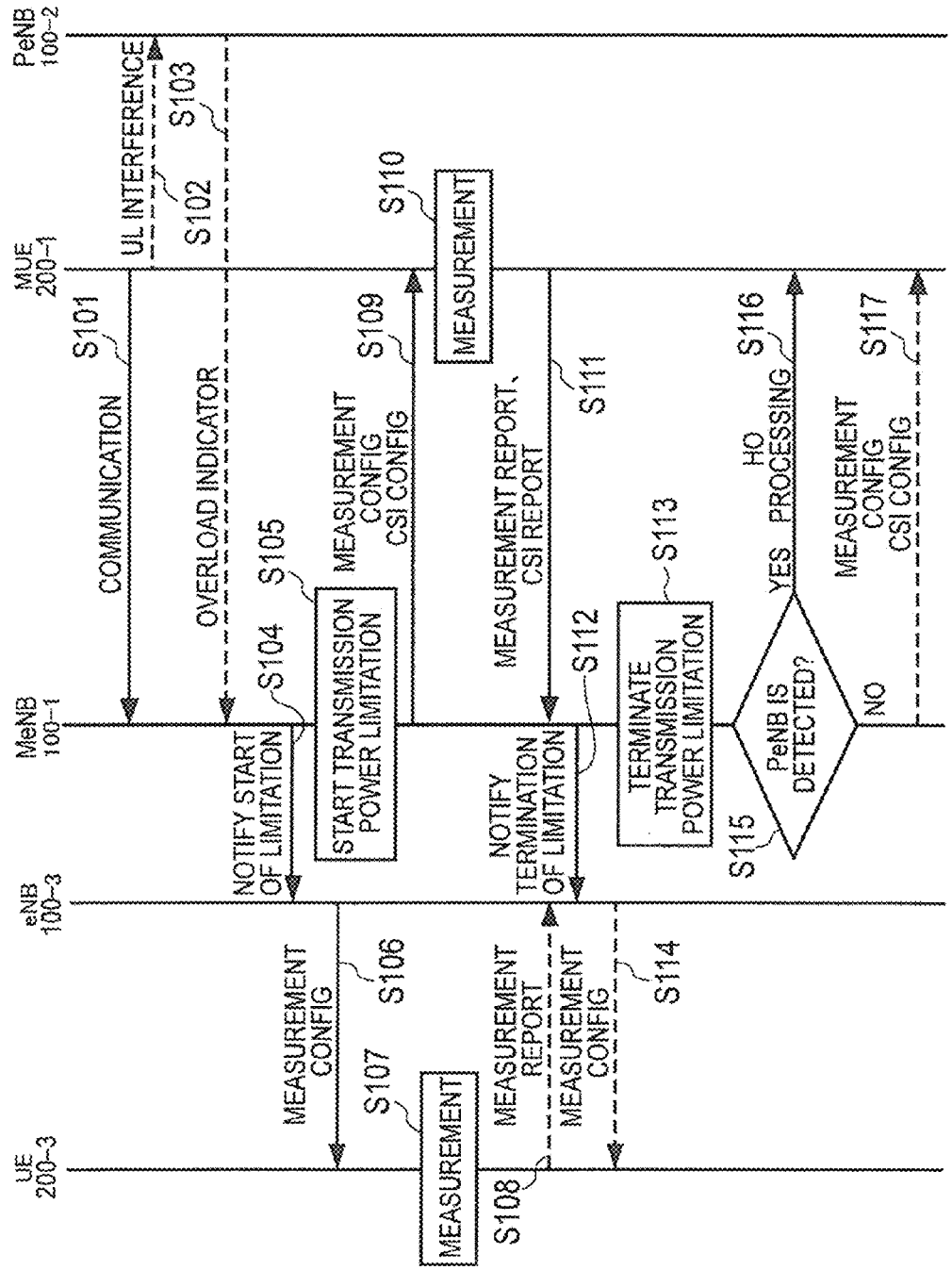
FIG. 8 shows one example of an entire operation of the mobile communication system according to the first embodiment.

Hereinafter, using the situation shown in FIG. 1 as an example, an overall operation of the mobile communication system according to the present embodiment is described. FIG. 8 shows one example of an entire operation of the mobile communication system according to the present embodiment. In an initial state of this sequence, the MUE 200-1 does not detect a cell of the PeNB 100-2 nor reports the RSRP measurement result for the PeNB 100-2 to the MeNB 100-1. Note that the signaling shown by the broken line in FIG. 8 is not necessarily needed.

As shown in FIG. 8, at step S101, the MUE 200-1 performs radio communications with the MeNB 100-1. At step S102, the PeNB 100-2 receives interference by an uplink signal from the MUE 200-1. The PeNB 100-2 measures an interference level for each RB in the uplink. At step S103, the PeNB 100-2 transmits Overload Indicator showing the interference level for each RB in the uplink to the MeNB 100-1 on the X2 interface. With this, the uplink interference detected by the PeNB 100-2 is notified to the MeNB 100-1. The MeNB 100-1 grasps that the uplink interference is caused in the PeNB 100-2 based on the Overload Indicator from the PeNB 100-2. Then, processing to search for an MUE 200-1 being an interference source among the MUEs 200-1 is started.

At step S104, the MeNB 100-1 notifies an eNB 100-3 on the X2 interface that the muting/power reduction is performed in the cell of CC1. Or, the MeNB 100-1 may notify/instruct that the cell of CC1 is set to be a cell search non-target cell or may notify/instruct that the cell of CC2 is set to be a cell search target cell.

At step S105, the MeNB 100-1 starts the muting/power reduction.

At step S106, in response to the notification at step S104, the eNB 100-3 performs control such that the UE 200-3 will avoid selecting the cell (the cell of CC1) under the muting/power reduction as a measurement target. Or, the eNB 100-3 performs control such that the UE 200-3 will select the cell (the cell of CC2) not under the muting/power reduction as a measurement target.

At step S107, in response to the control at step S106, the UE 200-3 performs measurement (cell search) for a cell other than the cell (the cell of CC1) under the muting/power reduction. At step S108, the UE 200-3 repots the measurement result at step S107 to the eNB 100-3.

On the other hand, at step S109, the MeNB 100-1 performs the measurement control on the MUE 200-1 when the muting/power reduction is started at step S105. Specifically, the MeNB 100-1 transmits information for instructing the MUE 200-1 to perform the RSRP measurement for the PeNB 100-2 based only on the CRS within a specific RB. In addition, the MeNB 100-1 notifies the MUE 200-1 of the downlink bandwidth information of the PeNB 100-2. Furthermore, the MeNB 100-1 notifies the MUE 200-1 of a radio resource (subframe and RB) targeted for the muting/power reduction when the muting/power reduction is performed on the CRS.

At step S110, the MUE 200-1 performs the RSRP measurement and the CSI measurement in response to the control at step S109. Specifically, the MUE 200-1 measures RSRP for the PeNB based only on the CRS within the specific RB which is notified from the MeNB 100-1 among the RBs contained in the downlink bandwidth notified from the MeNB 100-1. Or, based on the notified downlink bandwidth, the MUE 200-1 may measure RSRP for the entire bandwidth. In addition, when for the muting/power reduction is performed on the CRI, the MUE 200-1 excludes the CSI measurement result for the radio resource targeted for the muting/power reduction from the measurement results to be reported to the MeNB 100-1.

At step S111, the MUE 200-1 reports the measurement result at step S111 to the MeNB 100-1. Here, if the MUE 200-1 is located around the boundary of the coverage area of the PeNB 100-2, the measurement report includes the RSRP measurement result for the PeNB 100-2.

Note that, the processing at steps S109 to S111 may be performed on multiple MUEs 200-1 individually, or may be performed only on a candidate MUE 200-1 located around the boundary of the coverage area of the PeNB 100-2.

On terminating the collection of such measurement reports, at step S112, the MeNB 100-1 notifies the eNB 100-3 on the X2 interface that the muting/power reduction is terminated in the cell of CC1. Or, the MeNB 100-1 may notify/instruct that the cell of CC1 is set to be a cell search target cell.

At step S113, the MeNB 100-1 terminates the muting/power reduction.

At step S114, in response to the notification at step S104, the eNB 100-3 performs control such that the UE 200-3 will also select the cell (the cell of CC1) under the muting/power reduction as a measurement target.

At step S115, the MeNB 100-1 checks whether the measurement report received at step S111 contains the RSRP measurement result for the PeNB 100-2 (for example, the RSRP measurement result corresponding to a cell ID of the PeNB 100-2). When the measurement report does not contain the RSRP measurement result for the PeNB 100-2 (step S117; NO), the measurement setting set at step S109 is cancelled at step S117.

On the other hand, when the RSRP measurement result for PeNB 100-2 is contained in the measurement report (step S115: YES), the MUE 200-1 is identified as an uplink interference source for the PeNB 100-2. Then, at step S115, the MeNB 100-1 causes the MUE 200-1 of the interference source to perform handover from the cell of CC1 to the cell of CC2. Or, if possible, the MUE 200-1 of the interference source may perform handover to a cell of the PeNB 100-2.

Second Embodiment

In the following, a second embodiment is described in terms of differences from the first embodiment.

In the present embodiment, in a CC1, a PeNB 100-2 transmits new PSS/SSS/MIB (second PSS/SSS/MIB) at another frequency band (a second frequency band) in addition to normal PSS/SSS/MIB (first PSS/SSS/MIB) transmitted in a center frequency band (a first frequency band). Hereinafter, such new PSS/SSS/MIB is referred to as "ePSS/eSSS/eMIB". Basically, the configuration of ePSS/eSSS/eMIB is same as the configuration of normal PSS/SSS/MIB. However, eMIB may contain frequency offset information of ePSS and eSSS. Here, the frequency offset means frequency offset of ePSS and eSSS from the normal PSS/SSS, that is, frequency offset of ePSS and eSSS from a DC sub-carrier. Note that the frequency offset of eMIB can be expressed by immediate data of the number of resource blocks (notation such as +10, −13 as offset from the center or, normal RB number notation such as 0, . . . , N_RB−1) or some predetermined indexes among the data (such as {n6, n15, n25, n36} which differs depending on a bandwidth).

The radio resource (subframe and RB) to be used for transmission of ePSS/eSSS/eMIB may be determined by the PeNB 100-2 or may be determined by the MeNB 100-1. When it is determined by the PeNB 100-2, the radio resource to be used for the transmission of ePSS/eSSS/eMIB is notified from the PeNB 100-2 to the MeNB 100-1. On the other hand, when it is determined by the MeNB 100-1, the radio resource to be used for the transmission of ePSS/eSSS/eMIB is notified from the MeNB 100-1 to the PeNB 100-2.

In addition, the MeNB 100-1 notifies the MUE 200-1 of the radio resource to be used for transmission of ePSS/eSSS/eMIB. Then, the MeNB 100-1 performs muting/power reduction with the radio resource (subframe and RB) for the ePSS/eSSS/eMIB. The MUE 200-1 performs RSRP measurement using the ePSS/eSSS/eMIB received from the PeNB 100-2 within a time period during which the muting/power reduction is performed.

With this, the MeNB 100-1 does not need to perform the muting/power reduction on the normal PSS/SSS/MIB. Thus, a UE 200-3 under control of the eNB 100-3 neighboring the MeNB 100-1 can search for a cell of CC1 in the MeNB 100-1 and does not cause reconnection due to a handover failure.

Figure 9:
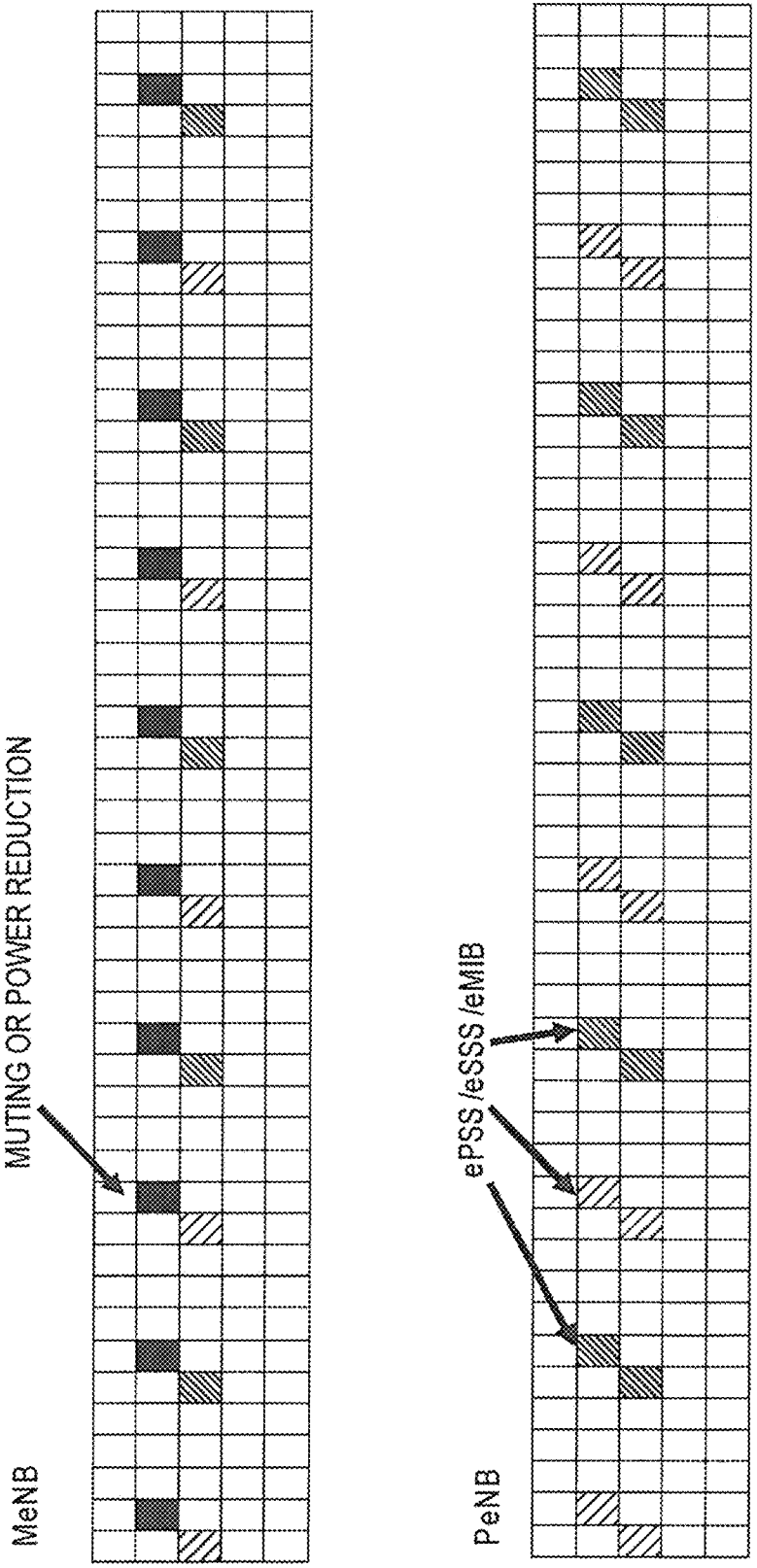
FIG. 9 shows one example of ePSS/eSSS/eMIB and muting/power reduction in a case where the MeNB and PeNB according to the second embodiment operate in subframe synchronization.

FIG. 9 shows one example of ePSS/eSSS/eMIB and muting/power reduction in a case where the MeNB 100-1 and PeNB 100-2 operate in subframe synchronization. As shown in FIG. 9, in the present embodiment, the PeNB 100-2 transmits ePSS, eSSS, and eMIB within a same RB and a same subframe. In this manner, as similar to the normal PSS/SSS/MIB, the ePSS, eSSS, and eMIB are transmitted in the same subframe and same RB (6 RB), so that a measurement processing load can be reduced as compared with the case where the ePSS, eSSS, and eMIB are distributed.

Also, when the MeNB 100-1 and PeNB 100-2 operate in subframe synchronization, the MeNB 100-1 performs the muting/power reduction only on the radio resource (specific subframe and 6 RBs) for the ePSS/eSSS/eMIB of the PeNB 100-2.

FIG. 10 shows one example of ePSS/eSSS/eMIB and muting/power reduction in a case where the MeNB 100-1 and PeNB 100-2 operate out of subframe synchronization. As shown in FIG. 10, as similar to the above, in this case, the PeNB 100-2 also transmits ePSS, eSSS, and eMIB within a same RB and a same subframe. In addition, when the MeNB 100-1 and PeNB 100-2 operate out of subframe synchronization, the MeNB 100-1 performs the muting/power reduction on the 6 RBs in the center and all subframes.

Hereinafter, using the situation shown in FIG. 1 as an example, an entire operation of the mobile communication system according to the present embodiment is described. FIG. 11 shows one example of an entire operation of the mobile communication system according to the present embodiment. In an initial state of the present sequence, the MUE 200-1 does not detects a cell of the PeNB 100-2 and does not report the RSRP measurement result for the PeNB 100-2 to the MeNB 100-1. Note that the signaling shown by the broken line in FIG. 11 is not necessarily needed.

As shown in FIG. 11, at step S201, the MUE 200-1 performs radio communications with the MeNB 100-1. At step S202, the PeNB 100-2 receives interference by an uplink signal from the MUE 200-1. The PeNB 100-2 measures an interference level for each RB in the uplink. At step S203, the PeNB 100-2 transmits Overload Indicator showing the interference level for each RB in the uplink to the MeNB 100-1 on the X2 interface. With this, the uplink interference detected by the PeNB 100-2 is notified to the MeNB 100-1. The MeNB 100-1 grasps that the uplink interference is caused in the PeNB 100-2 based on the Overload Indicator from the PeNB 100-2. Then, processing to search for an MUE 200-1 being an interference source among the MUEs 200-1 is started.

At step S204, the PeNB 100-2 determines a radio resource to be used for transmission of ePSS/eSSS/eMIB and notifies it to the MeNB 100-1 on the X2 interface. Or, the MeNB 100-1 determines a radio resource to be used for transmission of ePSS/eSSS/eMIB and notifies it to the PeNB 100-2 on the X2 interface.

At step S205, the PeNB 100-2 notifies the PUE 200-2 of the radio resource to be used for transmission of ePSS/eSSS/eMIB. With this, the PUE 200-2 is enabled to receive the ePSS/eSSS/eMIB. The PeNB 100-2 may give the notification to an eNB 100 (unillustrated) neighboring the PeNB 100-2. In addition, the MeNB 100-1 may notify the eNB 100-3 of the radio resource to be used for transmission of ePSS/eSSS/eMIB (at step S206).

At step S207, the PeNB 100-2 starts transmission of the ePSS/eSSS/eMIB using the radio resource to be used for transmission of the ePSS/eSSS/eMIB determined at step S204.

At step S208, the MeNB 100-1 starts the muting/power reduction.

At step S209, the MeNB 100-1 notifies the MUE 200-1 of the radio resource to be used for transmission of ePSS/eSSS/ eMIB. Here, as described in the first embodiment, the MeNB 100-1 may transmit information for instructing RSRP measurement of the PeNB 100-2 based only on CRS within a specific RB or may notify downlink bandwidth information of the PeNB 100-2. Furthermore, the MeNB 100-1 may notify the MUE 200-1 of a radio resource (subframe and RB) targeted for the muting/power reduction when the muting/power reduction is performed on the CRS.

At step S210, the MUE 200-1 performs the RSRP measurement in response to the control at step S209. Specifically, the MUE 200-1 performs the RSRP measurement on the PeNB 100-2 using the ePSS/eSSS/eMIB based on the notification of the radio resource to be used for transmission of ePSS/eSSS/eMIB.

At step S211, the MUE 200-1 reports the measurement result at step S210 to the MeNB 100-1. Here, in the case of the MUE 200-1 around the boundary of the coverage area of the PeNB 100-2, the RSRP measurement result for the PeNB 100-2 is contained in the measurement report.

Note that, the processing at steps S209 to S211 may be respectively performed on multiple MUEs 200-1, or may be performed only on a candidate MUE 200-1 located around the boundary of the coverage area of the PeNB 100-2.

When the above-described collection of the measurement report is terminated, at step S212, the MeNB 100-1 terminates the muting/power reduction.

At step S213, the MeNB 100-1 notifies the PeNB 100-2 on the X2 interface of the termination of the ePSS/eSSS/eMIB. The PeNB 100-2 notifies (at step S214) the PUE 200-2 of the termination of the ePSS/eSSS/eMIB. The MeNB 100-1 may notify (at step S215) the eNB 100-3 of the termination of the ePSS/eSSS/eMIB.

At step S216, the MeNB 100-1 checks whether the measurement report received at step S211 contains the RSRP measurement result for the PeNB 100-2 (for example, the RSRP measurement result corresponding to a cell ID of the PeNB 100-2). When the measurement report does not contain the RSRP measurement result for the PeNB 100-2 (step S216; NO), the measurement setting set at step S209 is cancelled at step S218.

On the other hand, when the RSRP measurement result for the PeNB 100-2 is contained in the measurement report (step S216: YES), the MUE 200-1 is identified as an uplink interference source for the PeNB 100-2. Then, at step S217, the MeNB 100-1 causes the MUE 200-1 of the interference source to perform handover from the cell of CC1 to the cell of CC2. Or, if possible, the MUE 200-1 of the interference source may perform handover to a cell of the PeNB 100-2.

In the situation shown in FIG. 1, the PeNB 100-2 is installed within the coverage area of the MeNB 100-1 and outside the coverage area of the eNB 100-3. In the situation where the PeNB 100-2 is installed in a region where the coverage areas of the MeNB 100-1 and the eNB 100-3 overlap each other, the eNB 100-3 performs the same operation as that of the MeNB 100-1. In other words, all neighboring base stations which may interfere with the PeNB 100-2 operate in cooperation with one another so as to use a same ePSS/eSSS/eMIB.

Other Embodiments

It should not be understood that the description and drawings which constitute one part of this disclosure limit the present invention. Various alternative embodiments, examples, and operational techniques will be obvious for those who are in the art from this disclosure.

The above-described respective embodiments are not limited to the case where they are implemented individually but may be implemented in combination with each other. For example, the technique described in the first embodiment may be applied to the second embodiment.

In addition, the information which is transmitted and received on the X2 interface in each embodiment may be transmitted and received on an S1 interface via EPC.

Furthermore, in each embodiment, the description is given using an example of the combination of an MeNB and a PeNB, but it may be a combination of an MeNB and a femtocell (HeNB), or a combination of a PeNB and a femtocell (HeNB).

The entire content of U.S. Provisional Application No. 61/555,290 (filed Nov. 3, 2011) is incorporated by reference.

INDUSTRIAL APPLICABILITY

As described above, the present invention is applicable in the field of wireless communication, such as mobile communication.

The invention claimed is:

1. A communication control method in a mobile communication system, comprising:
   transmitting, by a first base station, a first synchronization signal at a first frequency band in the center of a particular carrier, the first synchronization signal being for use to establish synchronization;
   transmitting, by the first base station in response to receiving uplink interference within the particular carrier, a second synchronization signal in a second frequency band different from the first frequency band within the particular carrier, the second synchronization signal being for use to establish synchronization;
   notifying, by a second base station, a second user terminal under control of the second base station of a radio resource to be used for the transmission of the second synchronization signal;
   performing, by the second user terminal, measurement based on the radio resource notified by the second base station;
   transmitting, by the second user terminal, a measurement report of the measurement to the second base station;
   determining, by the second base station, whether a Reference Signal Received Power (RSRP) measurement result for the first base station is contained in the measurement report;
   in response to determining that the RSRP measurement result for the first base station is contained in the measurement report, identifying, by the second base station, the second user terminal as an interference source causing the uplink interference received by the first base station within the particular carrier; and
   causing, by the second base station, the second user terminal identified as the interference source, to perform handover from the particular carrier to another carrier.

2. The communication control method according to claim 1, wherein
   the first synchronization signal includes a first primary synchronization signal and a first secondary synchronization signal,
   the second synchronization signal includes a second primary synchronization signal and a second secondary synchronization signal, and the second primary synchronization signal and the second secondary synchronization signal are transmitted using a same resource block.

3. The communication control method according to claim 2, wherein
the second primary synchronization signal and the second secondary synchronization signal are transmitted using a same resource block and a same subframe.

4. The communication control method according to claim 1, wherein
the first base station further transmits a first master information block containing system information in the first frequency band, and
the first base station further transmits a second master information block containing system information in the second frequency band.

5. The communication control method according to claim 4, wherein
the first synchronization signal includes a first primary synchronization signal and a first secondary synchronization signal,
the second synchronization signal includes a second primary synchronization signal and a second secondary synchronization signal, and
the second primary synchronization signal, the second secondary synchronization signal, and the second master information block are transmitted using a same resource block.

6. The communication control method according to claim 5, wherein
the second primary synchronization signal, the second secondary synchronization signal, and the second master information block are transmitted using a same resource block and a same subframe.

7. The communication control method according to claim 1, further comprising:
the first base station notifying the second base station of the radio resource to be used for the transmission of the second synchronization signal.

8. The communication control method according to claim 1, further comprising:
receiving a notification by the first base station from the second base station, the notification indicating the radio resource to be used for the transmission of the second synchronization signal, wherein
the first base station performs transmission with the radio resource notified.

9. The communication control method according to claim 7, further comprising:
notifying, by the second base station, a third base station, of the radio resource to be used for the transmission of the second synchronization signal.

10. The communication control method according to claim 7, further comprising:
notifying, by the first base station, a first user terminal under control of the first base station, of the radio resource to be used for the transmission of the second synchronization signal.

11. The communication control method according to claim 1, further comprising:
limiting, by the second base station, transmission power in the radio resource to be used for the transmission of the second synchronization signal.

12. A second base station in a mobile communication system, comprising:
a processor coupled to a memory, the processor configured to:
receive, from a first base station, an overload signal indicating uplink interference within a particular carrier received by the first base station;
notify a second user terminal under control of the second base station of a radio resource to be used for transmission of a second synchronization signal, wherein the second synchronization signal is transmitted by the first base station in a second frequency band within the particular carrier different from a first frequency band within the center of the particular carrier, the first frequency band being used for transmitting a first synchronization signal;
receive a measurement report from the second user terminal, wherein the measurement report indicates a result of a measurement performed by the second user terminal based on the radio resource notified by the second base station;
determine whether a Reference Signal Received Power (RSRP) measurement result for the first base station is contained in the measurement report;
in response to determining that the RSRP measurement result for the first base station is contained in the measurement report, identify the second user terminal as an interference source causing the uplink interference received by the first base station within the particular carrier; and
cause the second user terminal identified as the interference source to perform handover from the particular carrier to another carrier.

* * * * *